United States Patent [19]

Shimizu et al.

[11] Patent Number: 5,748,245
[45] Date of Patent: May 5, 1998

[54] ENCODING APPARATUS FOR ENCODING INPUT INFORMATION DATA WHILE CONTROLLING A CODE QUANTITY OF ENCODED INFORMATION DATA

[75] Inventors: Tetsuya Shimizu, Yokohama; Yoshitaka Takeuchi, Tokyo, both of Japan

[73] Assignee: Canon Kabushiki Kaisha

[21] Appl. No.: 653,975

[22] Filed: May 28, 1996

Related U.S. Application Data

[63] Continuation of Ser. No. 218,637, Mar. 28, 1994, abandoned.

[30] Foreign Application Priority Data

| Mar. 29, 1993 | [JP] | Japan | 5-093560 |
| Mar. 29, 1993 | [JP] | Japan | 5-093561 |
| Sep. 17, 1993 | [JP] | Japan | 5-255110 |

[51] Int. Cl.⁶ .................................................. H04N 7/30
[52] U.S. Cl. .................................. 348/405; 348/420
[58] Field of Search ................................ 348/384, 390, 348/400–403, 405, 408–412, 419, 420; 382/232, 236, 238, 248, 250; H04N 7/133

[56] References Cited

U.S. PATENT DOCUMENTS

| 5,006,931 | 4/1991 | Shirota | 348/408 |
| 5,136,377 | 8/1992 | Johnston et al. | 348/419 |
| 5,144,426 | 9/1992 | Tanaka et al. | 348/409 |
| 5,196,933 | 3/1993 | Henot | 348/419 |
| 5,337,049 | 8/1994 | Shimoda | 348/390 |
| 5,469,213 | 11/1995 | Koga et al. | 348/405 |

*Primary Examiner*—Richard Lee
*Attorney, Agent, or Firm*—Fitzpatrick, Cella, Harper & Scinto

[57] ABSTRACT

An encoding apparatus includes an input device which inputs sample information data, and a block forming device which forms blocks of the input information data. A detector detects a code quantity of encoded data on a unit basis of a predetermined number of encoded blocks, and a one-dimension processor processes the encoded data of the predetermined number of blocks. A deletion device deletes the encoded data in accordance with the one-dimension processed encoded data and the output of the detector.

23 Claims, 18 Drawing Sheets

FIG. 2

LOW
FREQUENCY
SIDE

| 0 | 1 | 5 | 6 | 14 | 15 | 27 | 28 |
|---|---|---|---|----|----|----|----|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

HIGH
FREQUENCY
SIDE

FIG.14

| CLASS / SIGNAL | 1 | 2 | 3 | 4 |
|---|---|---|---|---|
| Y | T0 | T1 | T2 | T3 |
| Cr | T1 | T2 | T3 | T3 |
| Cb | T2 | T3 | T3 | T3 |

FIG. 15

| FREQUENCY BAND / QUANTIZATION NO. | 1 | 2 | 3 | 4 |
|---|---|---|---|---|
| 0 | 1/8 | 1/16 | 1/16 | 1/16 |
| 1 | 1/8 | 1/8 | 1/16 | 1/16 |
| 2 | 1/8 | 1/8 | 1/8 | 1/16 |
| 3 | 1/8 | 1/8 | 1/8 | 1/8 |
| 4 | 1/4 | 1/8 | 1/8 | 1/8 |
| 5 | 1/4 | 1/4 | 1/8 | 1/8 |
| 6 | 1/4 | 1/4 | 1/4 | 1/8 |
| 7 | 1/4 | 1/4 | 1/4 | 1/4 |
| 8 | 1/2 | 1/4 | 1/4 | 1/4 |
| 9 | 1/2 | 1/2 | 1/4 | 1/4 |
| 10 | 1/2 | 1/2 | 1/2 | 1/4 |
| 11 | 1/2 | 1/2 | 1/2 | 1/2 |
| 12 | 1 | 1/2 | 1/2 | 1/2 |
| 13 | 1 | 1 | 1/2 | 1/2 |
| 14 | 1 | 1 | 1 | 1/2 |
| 15 | 1 | 1 | 1 | 1 |

TABLE 0 ( T0 )

FIG. 16

| QUANTIZATION NO. \ FREQUENCY BAND | 1 | 2 | 3 | 4 |
|---|---|---|---|---|
| 0 | 1/16 | 1/16 | 1/16 | 1/16 |
| 1 | 1/8 | 1/16 | 1/16 | 1/16 |
| 2 | 1/8 | 1/8 | 1/16 | 1/16 |
| 3 | 1/8 | 1/8 | 1/8 | 1/16 |
| 4 | 1/8 | 1/8 | 1/8 | 1/8 |
| 5 | 1/4 | 1/8 | 1/8 | 1/8 |
| 6 | 1/4 | 1/4 | 1/8 | 1/8 |
| 7 | 1/4 | 1/4 | 1/4 | 1/8 |
| 8 | 1/4 | 1/4 | 1/4 | 1/4 |
| 9 | 1/2 | 1/4 | 1/4 | 1/4 |
| 10 | 1/2 | 1/2 | 1/4 | 1/4 |
| 11 | 1/2 | 1/2 | 1/2 | 1/4 |
| 12 | 1/2 | 1/2 | 1/2 | 1/2 |
| 13 | 1 | 1/2 | 1/2 | 1/2 |
| 14 | 1 | 1 | 1/2 | 1/2 |
| 15 | 1 | 1 | 1 | 1/2 |

TABLE 1 (T1)

FIG. 17

| FREQUENCY BAND / QUANTIZATION NO. | 1 | 2 | 3 | 4 |
|---|---|---|---|---|
| 0 | 1/16 | 1/16 | 1/16 | 1/32 |
| 1 | 1/16 | 1/16 | 1/16 | 1/16 |
| 2 | 1/8 | 1/16 | 1/16 | 1/16 |
| 3 | 1/8 | 1/8 | 1/16 | 1/16 |
| 4 | 1/8 | 1/8 | 1/8 | 1/16 |
| 5 | 1/8 | 1/8 | 1/8 | 1/8 |
| 6 | 1/4 | 1/8 | 1/8 | 1/8 |
| 7 | 1/4 | 1/4 | 1/8 | 1/8 |
| 8 | 1/4 | 1/4 | 1/4 | 1/8 |
| 9 | 1/4 | 1/4 | 1/4 | 1/4 |
| 10 | 1/2 | 1/4 | 1/4 | 1/4 |
| 11 | 1/2 | 1/2 | 1/4 | 1/4 |
| 12 | 1/2 | 1/2 | 1/2 | 1/4 |
| 13 | 1/2 | 1/2 | 1/2 | 1/2 |
| 14 | 1 | 1/2 | 1/2 | 1/2 |
| 15 | 1 | 1 | 1/2 | 1/2 |

TABLE 2 ( T2 )

FIG. 18

| FREQUENCY BAND / QUANTIZATION NO. | 1 | 2 | 3 | 4 |
|---|---|---|---|---|
| 0 | 1/16 | 1/16 | 1/32 | 1/32 |
| 1 | 1/16 | 1/16 | 1/16 | 1/32 |
| 2 | 1/16 | 1/16 | 1/16 | 1/16 |
| 3 | 1/8 | 1/16 | 1/16 | 1/16 |
| 4 | 1/8 | 1/8 | 1/16 | 1/16 |
| 5 | 1/8 | 1/8 | 1/8 | 1/16 |
| 6 | 1/8 | 1/8 | 1/8 | 1/8 |
| 7 | 1/4 | 1/8 | 1/8 | 1/8 |
| 8 | 1/4 | 1/4 | 1/8 | 1/8 |
| 9 | 1/4 | 1/4 | 1/4 | 1/8 |
| 10 | 1/4 | 1/4 | 1/4 | 1/4 |
| 11 | 1/2 | 1/4 | 1/4 | 1/4 |
| 12 | 1/2 | 1/2 | 1/4 | 1/4 |
| 13 | 1/2 | 1/2 | 1/2 | 1/4 |
| 14 | 1/2 | 1/2 | 1/2 | 1/2 |
| 15 | 1 | 1/2 | 1/2 | 1/2 |

TABLE 3 (T3)

5,748,245

ENCODING APPARATUS FOR ENCODING INPUT INFORMATION DATA WHILE CONTROLLING A CODE QUANTITY OF ENCODED INFORMATION DATA

This application is a continuation of application Ser. No. 08/218,637 filed Mar. 28, 1994, now abandoned.

BACKGROUND OF THE INVENTION

1. Field of the Invention

The present invention relates to an encoding apparatus for encoding input information data, and more particularly to an encoding apparatus for encoding input information data while controlling a code quantity of encoded information data.

2. Related Background Art

Referring to FIG. 1, prior art encoding used in transmitting or recording digital image information such as a television signal is described.

FIG. 1 illustrates an example where digital data are grouped into two-dimensional blocks each consisting of vertical M×horizontal N pixels (where M and N are integers) in one frame of a television image, and which is processed by an orthogonal conversion and variable length encoding.

In FIG. 1, image data for pixels on a screen is applied to an input unit 1 and the input image data is grouped into M×N two-dimensional blocks of image data by a grouping circuit 2, and the pixel data is converted to orthogonally converted block data 5 representing M×N frequency components by an orthogonal conversion circuit 4.

Then, the orthogonally converted block data 5 is supplied to a quantization circuit 6 where quantized data is produced, and is supplied to a variable length encoding circuit 8 for encoding with a variable length.

The variable length encoding circuit 8 rearrange each of the orthogonally converted blocks by zig-zag scanning coefficients from a low frequency end to high frequency end of the frequency components. For example, where one orthogonally converted block consists of 8×8 data, the zig-zag scan is, in many cases, conducted in the order shown in FIG. 2. The variable length encoding is conducted on a data train representing the one-dimensional frequency components.

The encoded data 10 is formatted by a formatter 11 and the formatted data is output from an output unit 14 for transmission or recording.

The code quantity of the data thus encoded is limited depending on a capacity of a medium used for the transmission or recording.

In a prior art method for controlling the code quantity, the code quantity for each orthogonally converted block stored in a buffer 9 or for a plurality of orthogonally converted blocks (hereinafter referred to as a code quantity control block) is counted by a code quantity calculation circuit 12 so that the quantization is conducted with coefficients of a quantization table which meets the object.

When an overflow occurs by failing to suppress the desired code quantity by an existing quantization table, the code quantity is reduced in the process of formatting by deleting the coefficients in each of the orthogonally converted blocks as requied in the order starting from the high frequency end in which the affect to the decoded image is less.

Assuming that a unit for the code quantity control comprises three orthogonally converted blocks and a run-length Huffman encoding method is used in which the coefficients are classified into zero and non-zero significant coefficients, and a code is defined by a combination of the number of consecutive zero coefficients starting from the low frequency end and significant coefficients following thereafter, and an EOB (end of block) code is added following to the last significant coefficient in the block to omit the zero coefficients in the high frequency region, the code quantity control is conducted in such a manner that the formatting is conducted sequentially from the first block as shown in FIGS. 3A, 3B and 3C, and when the target code quantity is reached at the third block from the last, the EOB code is added.

In FIGS. 3A to 3C, the coefficients in a hatched area of solid line blocks represent those coefficients which will be zeros following the last significant coefficient when they are rearranged in the orthogonally converted block from the low freqnecy end to the high frequency end. The coefficients in the high frequency region of the orthogonally concerted block sectioned by broken lines represent those coefficients which will be deleted by the code quantity control.

When such a code quantity control method is used, frequency components in some of the orthogonally converted blocks in relatively low frequency region may be cut away. In addition, this occurs unevenly among the orthogonally converted blocks in the code quantity contort block. As a result, when the transmission or recording is conducted, the decoded image includes deterioration of image quality such as block distortion and the reproduction of an image which is close to an original image cannot be attained.

The code quantity control block frequently comprises orthogonally converted blocks representing different signals components such as a block representing a luminance signal and a block representing a color difference signal. Accordingly, when the code quantity is to be reduced, it is necessary to conduct weighting for a visual sense characteristic of a human being to the orthogonally converted blocks representing the respective signal components.

SUMMARY OF THE INVENTION

In the light of the above, it is an object of the present invention to provide an encoding apparatus which prevents encoded data, which will not be transmitted because of an overflow caused during the encoding of information data, from being concentrated in particular blocks to permit the reproduction of information data which is close to the original information data from the decoded data after transmission or recording. (For example, where the information data is image data, the deterioration of image quality such as block distortion is prevented.)

To achieve the above object, in one aspect of the invention, there is provided an encoding apparatus comprising input means for supplying sampled information data, block forming means for forming blocks of information data supplied by said input means, encoding means for encoding information data output from said block forming means, detection means for detecting a code quantity of encoded data derived by consolidating and encoding said blocks, one-dimension processing means for applying one-dimension processing to the encoded data of said blocks, and deletion means for deleting the encoded data in accordance with the encoded data processed by said one-dimension processing means in accordance with the output of said detection means.

In another aspect of the invention, there is provided an encoding apparatus comprising input means for supplying sampled image data, encoding means for encoding the image data, detection means for detecting a code quantity of the encoded data for each predetermined unit, deletion means for deleting the encoded data in accordance with the output of said detection means, and control means for controlling the deletion process by said deletion means in accordance with signal components of the image data.

In accordance with a further aspect of the invention, there is provided an encoding apparatus for forming blocks of input information data, encoding the formed blocks of information data and writing the encoded data in a transmission format having a predetermined area provided for each block, comprising memory means for storing encoded data which overflows the predetermined area provided for the block when the encoded data is written in the transmission format, measurement means for measuring the encoded data which overflows the predetermined area for each unit comprising a plurality of said blocks, and control means for stopping the transmission of the encoded data stored in said memory means in response to the output of said measurement means.

Other objects and advantages of the invention will become apparent from the following detailed description taken in conjunction with the appended claims.

BRIEF DESCRIPTION OF THE DRAWINGS

FIG. 2 illustrates zig-zag scanning when frequency components are scanned from a low frequency end to a high frequency end in an orthogonally converted block, FIG. 14 illustrates a selection of quantization table for each class for Y/Cr/Cb in the second embodiment, FIG. 15 is a quantization table for each band for quantized numbers in the second embodiment, FIG. 16 is a quantization table for each band for quantized numbers in the second embodiment, FIG. 17 is a quantization table for each band for quantized numbers in the second embodiment, and FIG. 18 is a quantization table for each band for quantized numbers in the second embodiment.

DETAILED DESCRIPTION OF THE PREFERRED EMBODIMENTS

A first embodiment of the image encoding apparatus of the present invention is now described with reference to the drawings.

Figure 1:
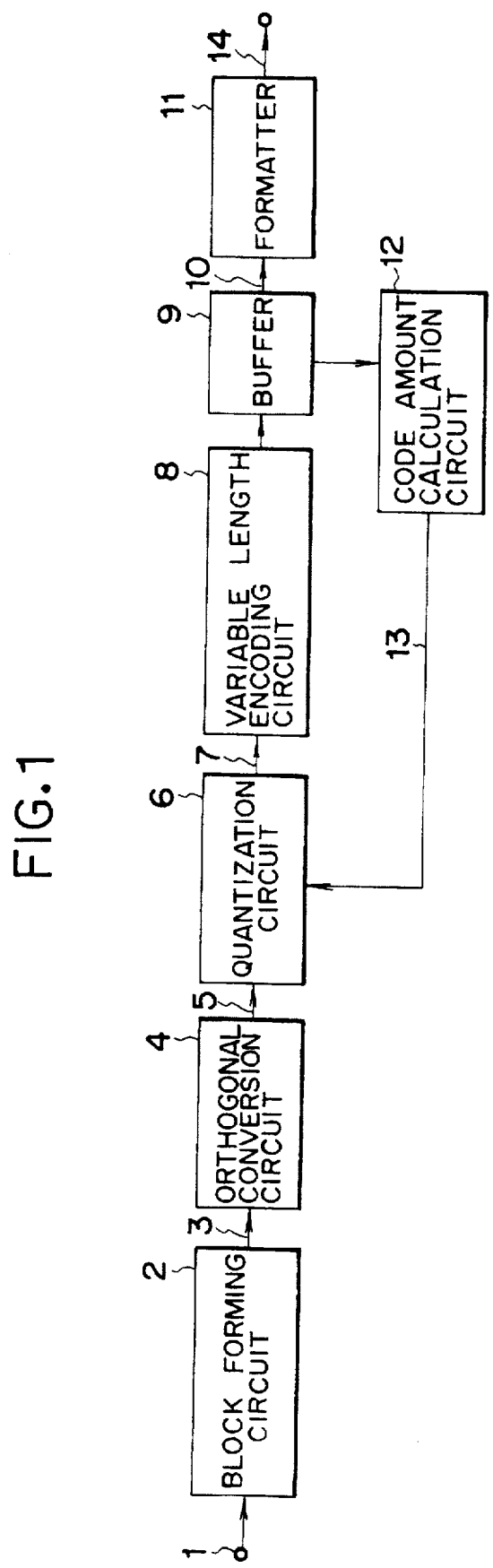
FIG. 1 is a block diagram of a prior art image encoding apparatus.
Figure 3A:
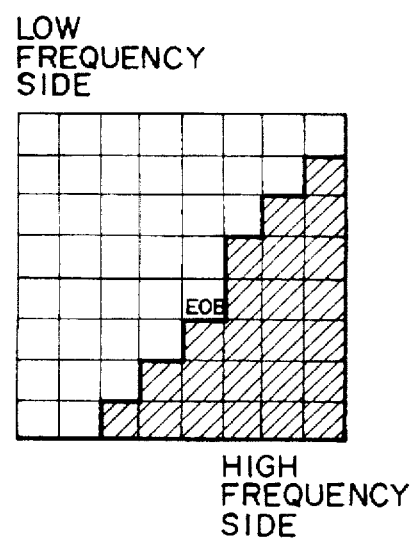
FIGS. 3A to 3C illustrate data which are deleted in a prior art code quantity control.
Figure 3B:
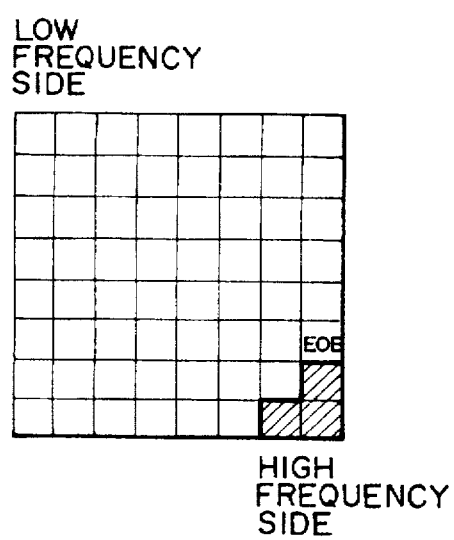
Figure 3C:
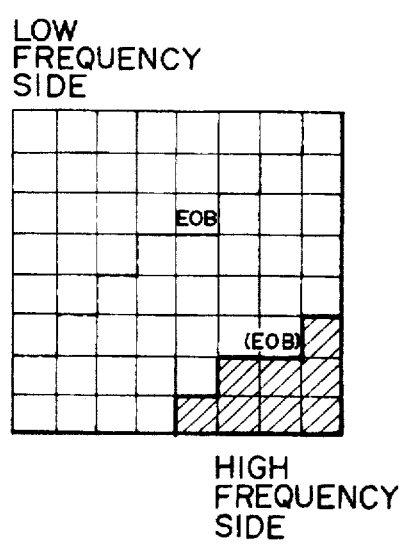
Figure 4:
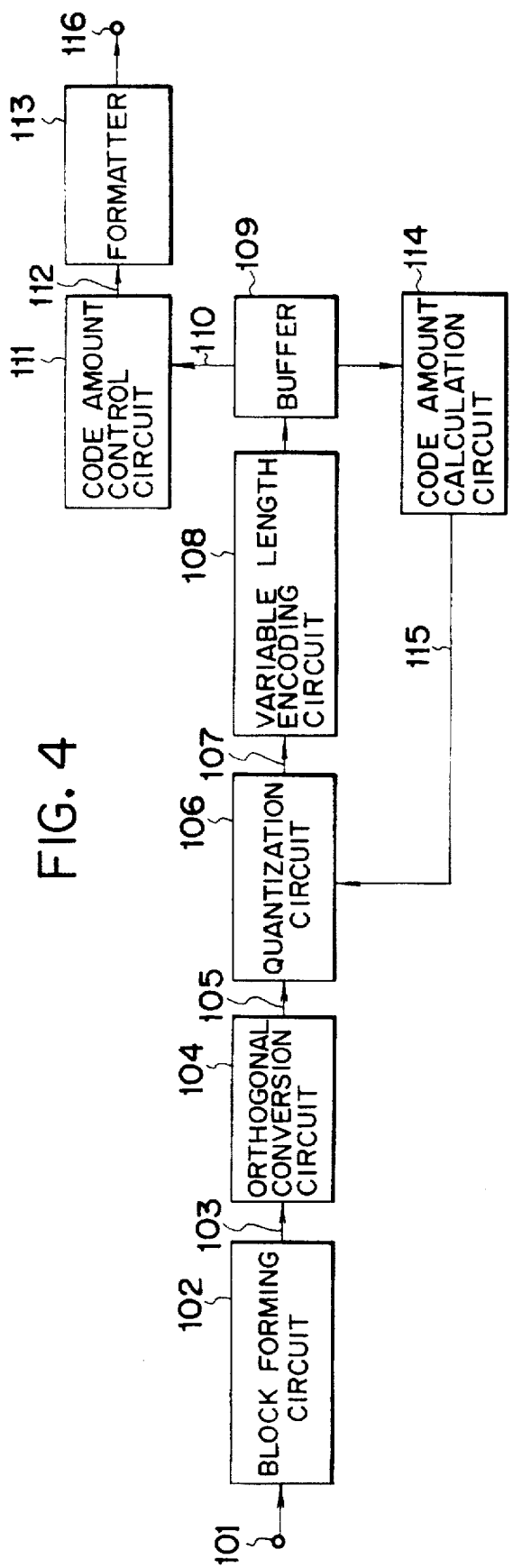
FIG. 4 is a block diagram of an image encoding apparatus in accordance with one embodiment of the present invention.

FIG. 4 is a block diagram of an image encoding apparatus in accordance with the first embodiment. In the present embodiment, in order to transmit or record an image of a television signal, the orthogonal conversion and the variable length encoding are conducted for each 8×8 pixel block, although the present invention is not limited to the block size of 8×8. The following description is made in conjunction with the block diagram of FIG. 4.

In FIG. 4, digital image data of a television signal is supplied from an input unit 101, and the input image data is two-dimensionally grouped into blocks each consisting of 8×8 pixels by block forming circuit 102. They are further grouped into code quantity control blocks each consisting of a plurality of blocks for use in subsequent code quantity control and formatting.

Thereafter, the data 103 is converted to data 105 representing frequency components by an orthogonal conversion circuit 104 and is then quantized by a quantization circuit 106. The quantized data 107 is rearranged by zig-zag scan by a variable length encoding circuit 108 in the number sequence shown in FIG. 2 from the low frequency end to the high frequency end.

Then, the data is run-length Huffman encoded in which the number of consecutive zeros (run length) and non-zero significant coefficients following thereafter are combined and codes are assigned thereto in accordance with frequencies of occurrence.

A quantization table of the quantization circuit 106 is switched for each code quantity control block. Namely, a quantity of encoded data after the variable length encoding is stored in a buffer 109 for each code quantity control block which is calculated by a code quantity calculation circuit 114, and an appropriate quantization table is selected to suppress the quantity of code generated.

However, even with the quantization table capable of suppressing most of the quantity of code generated, an overflow may occur in the formatting for the transmission or recording because the quantity of code generated cannot be suppressed to the code quantity defined by the format.

Figure 5:
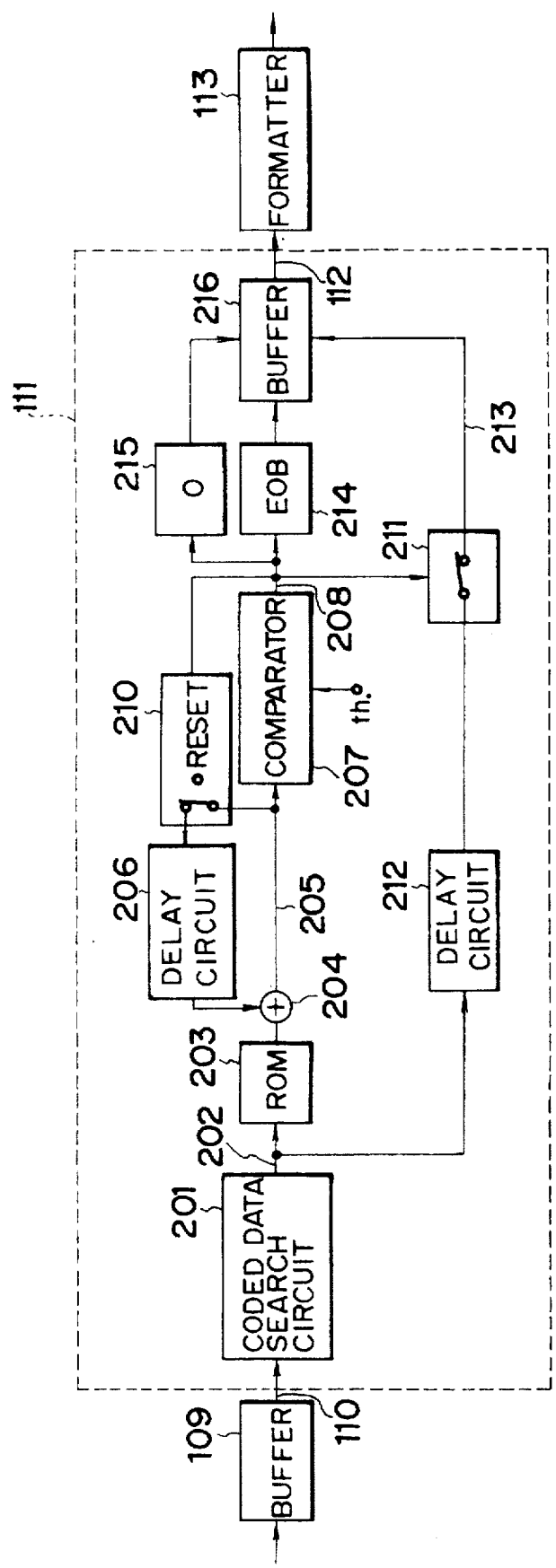
FIG. 5 is a block diagram of a code quantity control circuit in the first embodiment.

By using a code quantity control circuit 111 which is a feature of the present invention to cut away overflow data, the quantity of code generated is suppressed so that the deterioration of the image quality such as block distortion in decoding the image is prevented. In this manner, the image which is close to the original image can be reproduced. Referring to FIG. 5, the present method is now described.

FIG. 5 is a block diagram of a detailed construction of the code quantity control circuit 111. In FIG. 5, the encoded data 110 in the code quantity control block stored in the buffer 109 is sequentially read, one code word at a time, for each block by an encoded data search circuit 201, as shown in FIG. 6.

Figure 6:
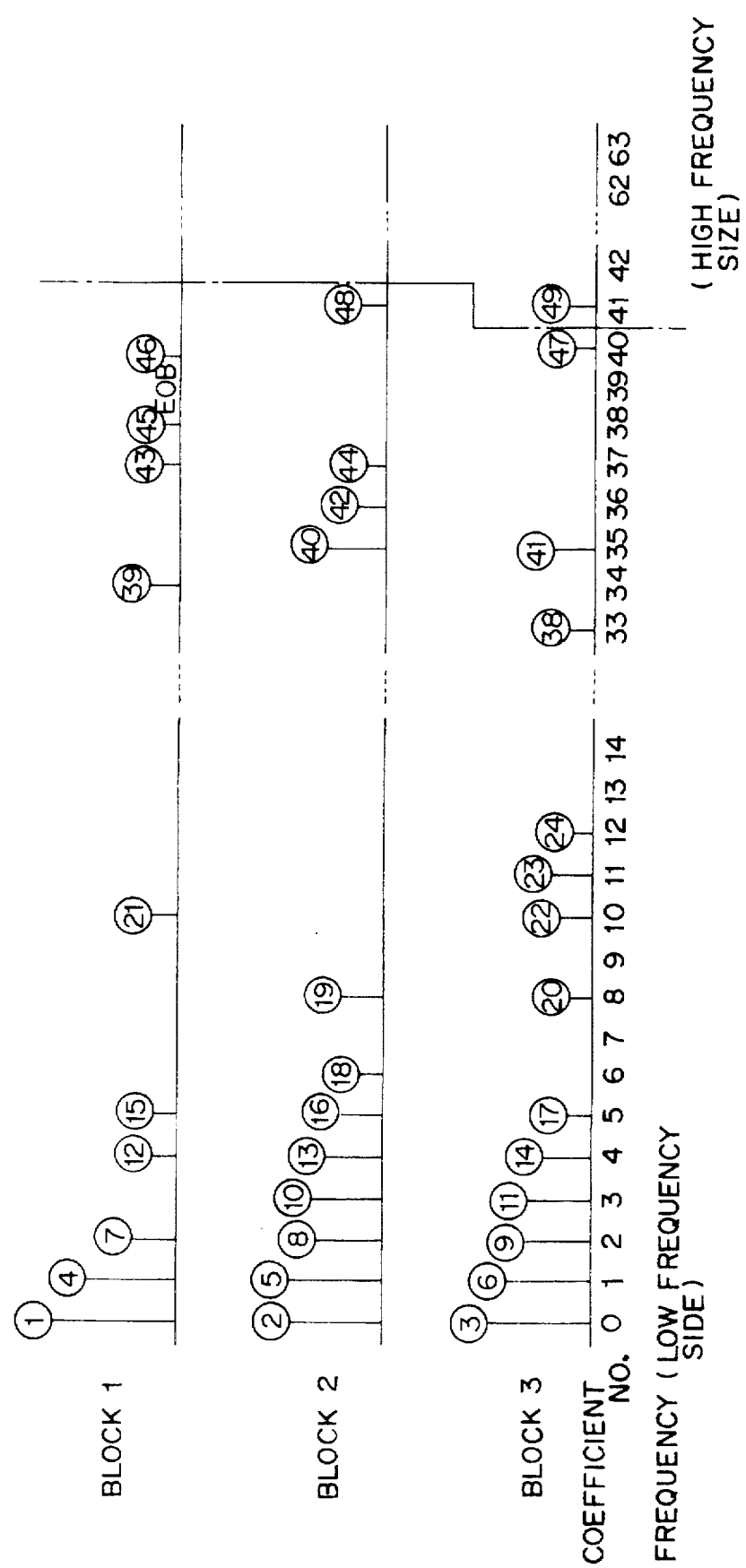
FIG. 6 illustrates an order of rearrangement of encoded data in a code quantity control block to conduct the code quantity control in the first embodiment.

In FIG. 6, an abscissa represents an order of coefficients rearranged in each block from the low frequency end to the high frequency end, and an ordinate represents a magnitude of an orthogonal conversion coefficient representing each frequency component. FIG. 6 is a configuration in which one code quantity control block consists of three orthogonal conversion blocks.

As shown in FIG. 2 for each block, the run-length Huffman encoded data arranged from the low frequency end to the high frequency end is read from each block in sequence for the data of the same frequency component.

Since the encoded data is the combination of the run length and the significant coefficients, the reading of the code is limited to an area of components where the significant coefficients are present. They are shown by circled numbers starting from the low frequency end as shown in FIG. 6.

The encoded data 202 sequentially read is replaced by code quantity data by using a ROM table 203. The code quantity data are sequentially added by using an adder 204 and a delay circuit 206. The accumulated total code quantity 205 is compared by a comparator 207 with a threshold th corresponding to the code quantity defined by the format, and when it reaches the threshold th, the comparator 207 generates a control signal 208.

In response to the control signal 208, the feed of the encoded data 202 which has heretofore been sent to a buffer 216 through a delay circuit 212 is stopped by a switch 211 at the data immediately before the overflowing data (the 48-th read data in FIG. 6) and an EOB code is added by an EOB code addition circuit 214 and zeros are filled in a blank area by a zero filling circuit 215. When the control signal 208 is applied to a reset circuit 210, the accumulation by the adder 204 is reset.

Figure 7A:
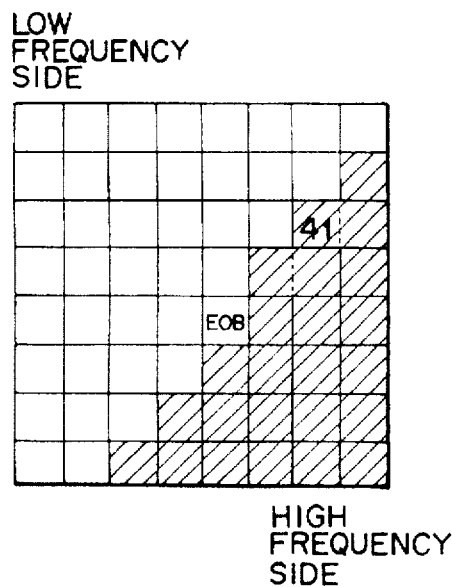
FIGS. 7A to 7C illustrates data which will be deleted when the code quantity control is conducted by the image encoding apparatus of the first embodiment in the code quantity control block constructed as shown in FIG. 6.
Figure 7B:
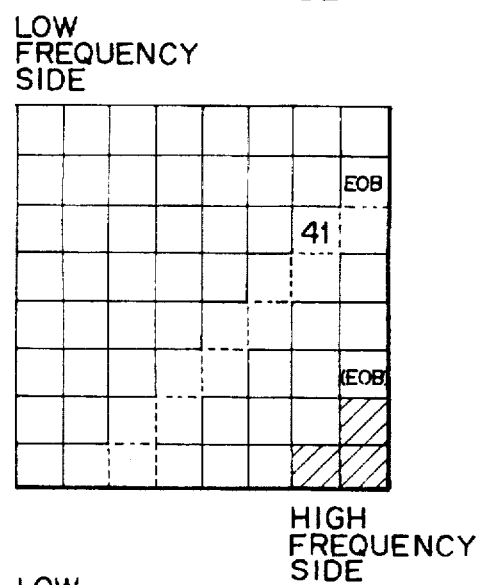
Figure 7C:
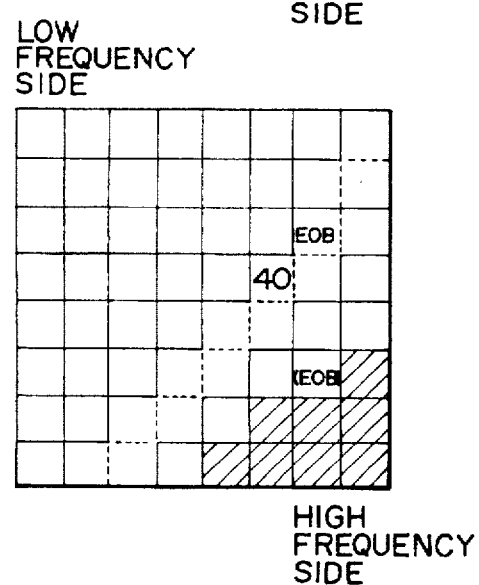

In the present method, as shown in FIG. 7A (corresponding to the first block), FIG. 7B (corresponding to the second block) and FIG. 7C (corresponding to the third block), of the overflow of the encoded data representing the frequency components of the blocks in the code quantity control block, the high frequency components which have less affect on the visual sense of a human being are deleted to suppress the code quantity to the capacity of the format. Yet, the substantially same frequency components of data in the orthogonally converted blocks can be deleted.

In FIGS. 7A to 7C, the coefficients shown in the hatched area of blocks sectioned by solid lines represent those coefficients which will be zero coefficients following to the last significant coefficient when they are rearranged in the orthogonal conversion block from the low frequency end to the high frequency end. The coefficients in the high frequency region in the orthogonal conversion blocks sectioned by the broken lines represent those coefficients which will be deleted by the code quantity control method of the present invention. The numbers in each block correspond to the numbers of data shown in FIG. 2 prior to the addition of the EOB by the present code quantity control method.

The encoded data 112 having the code quantity controlled is rearranged to fit to the format for the transmission or recording by a formatter 113 and the formatted data is output from an output unit 116.

A control method for the overflow when the code quantity control block comprises a block representing a luminance signal and a block representing a color difference signal is described below.

It is assumed that one code quantity control block comprises six orthogonally converted blocks, that is, four orthogonally converted blocks $Y_1$–$Y_4$ representing luminance signal components and two orthogonally converted blocks $P_r$ and $P_b$ representing color difference components. The configuration of the code quantity control circuit is the same as that shown in FIG. 5.

Figure 8:
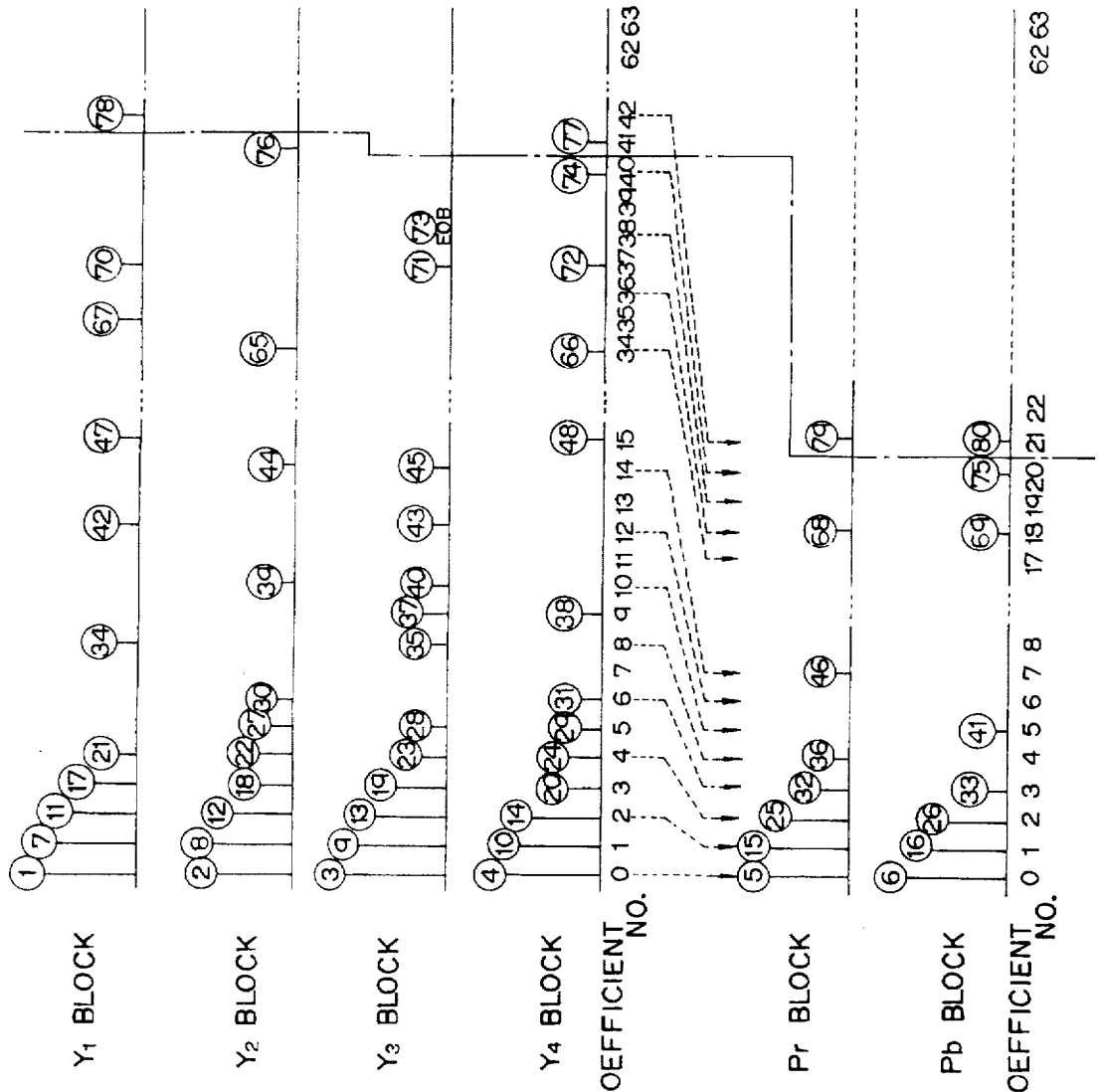
FIG. 8 illustrates an order of rearrangement of encoded data in the code quantity control block in order to conduct the code quantity control in the first embodiment.

In FIG. 8, an abscissa represents an order of coefficients rearranged in each block from the low frequency end to the high frequency end in the order shown in FIG. 2, and an ordinate represents a magnitude of orthogonal conversion coefficient representing the frequency component.

In FIG. 8, one code quality control block comprises six orthogonally converted blocks, that is, four orthogonally converted blocks $Y_1$–$Y_4$ representing the luminance signal components and two orthogonally converted blocks $P_r$ and $P_b$ representing the color difference components.

The run-length Huffman encoded data arranged in each block from the low frequency end to the high frequency end is sequentially read from respective blocks for the data having the same frequency component.

Since the encoded data is the combination of the zero's run length and the significant coefficients, the reading is limited to an area where the significant coefficients are present. This is sequentially conducted in the order of circled numbers as shown in FIG. 8 from the low frequency end.

In order to weight in reducing the code quantity while taking the visual sense of a human being into consideration, the frequency components of the blocks $P_r$–$P_b$ representing the color difference components which have less affect to the visual sense are read once while the frequency components of the blocks $Y_1$–$Y_4$ representing the luminance signal components which have more affect to the visual sense are read twice.

The ratio between the read signals represents the weighting to the respective signal components in the code quantity control. In the present embodiment, the ratio of the luminance signal Y/the color difference signal $P_r$/the color difference signal $P_b$ is 2/1/1. Alternatively, the color difference signal $P_r$ and $P_b$ is weighted to 4/2/1.

In this manner, the sequentially read encoded data 202 is replaced by the data of the code quantity by using the ROM table 203. The data of the code quantity is sequentially added by using the adder 204 and the delay circuit 206. The accumulated total code quantity 205 is compared by the comparator 207 with the threshold th which fits to the code quantity defined by the format and the comparator 207 generates a control signal 208.

In response to the control signal 208, the feed of the encoded data 202 which has heretofore been sent to the buffer 216 through the delay circuit 212 is stopped at the data which is immediately before the overflowing data (the 76-th read data in FIG. 4), an EOB is added by the EOB addition circuit 214, and zeros are filled in the blank area by the zero filling circuit 215. When the control signal 208 is applied to the reset circuit 210, the accumulation by the adder 204 is reset.

Figure 9:
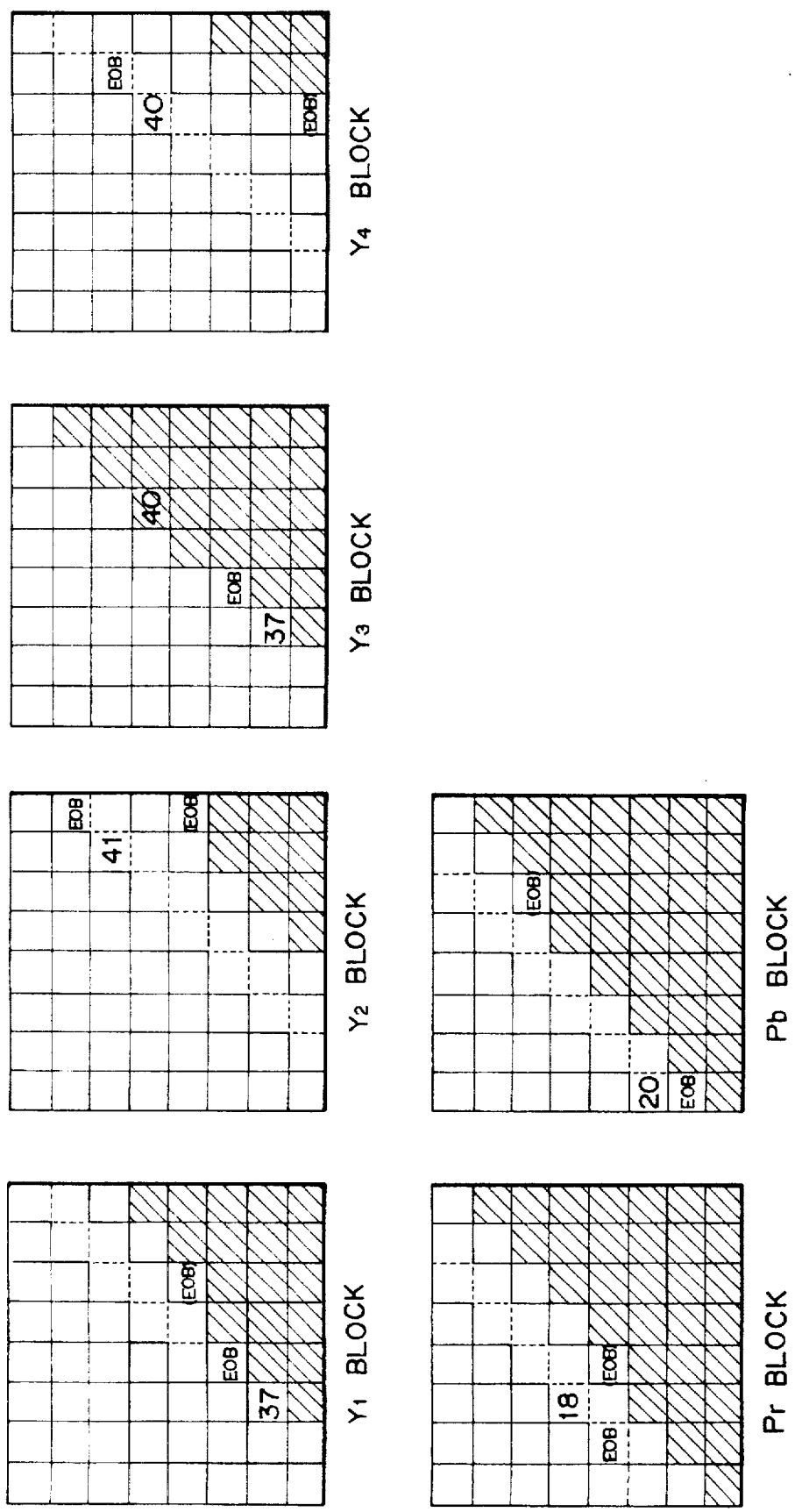
FIG. 9 illustrates data which will be deleted when the code quantity control is conducted by the image encoding apparatus of the first embodiment in the code quantity control block constructed as shown in FIG. 8.

In the present method, as shown in FIG. 9, of the overflow of the encoded data representing the frequency components of the respective blocks of the code quantity control block, the high frequency region which has less affect on the visual sense of a human being is deleted to suppress the code quantity within the capacity of the format.

In FIG. 9, the coefficients in the hatched area in the blocks sectioned by the solid lines represents those coefficients which will be zero coefficients following to the last significant coefficient when they are arranged in the orthogonally converted block from the low frequency end to the high frequency end. The high frequency region of the coefficients in the orthogonally converted blocks sectioned by the broken lines represent those coefficients which will be deleted by the code quantity control method of the present embodiment.

The numbers in the blocks correspond to the numbers of data in FIG. 2 before the addition of the EOB by the code quantity control method of the present embodiment. In the block $Y_3$, two numerals are shown. While the EOB should be added following to the 40-th data in the above code quantity control method, the EOB is added following to 37-th data in the input step of the data to the control circuit 111.

When the total code quantity is to be calculated, the encoded data representing the luminance components which more affect to the visual sense of a human being is read up to the higher frequency components than the encoded data representing the color difference components is read. Accordingly, the code quantity control which fits the visual sense characteristic is attained.

In addition, the data of the substantially same frequency component in the respective blocks are deleted.

The encoded data 112 having the code quantity controlled is rearranged by the formatter 113 to fit to the format for the transmission or recording.

As described above, when the code quantity control is conducted by using the image encoding apparatus of the first embodiment, the encoded data representing the frequency component in the high frequency region which are deleted by the overflow are substantially uniform among the blocks in the code quantity control block, and the deletion of the high frequency components which fits the visual sense characteristic of a human being is attained. Accordingly, the occurrence of the deterioration of the image quality such as block distortion of an image after the decoding of the encoded data is reduced and the reproduction of the image which is close to the original image after the decoding of the transmitted or recorded image is attained.

A second embodiment of the image encoding apparatus of the present invention is now described with reference to the drawings.

Figure 10:
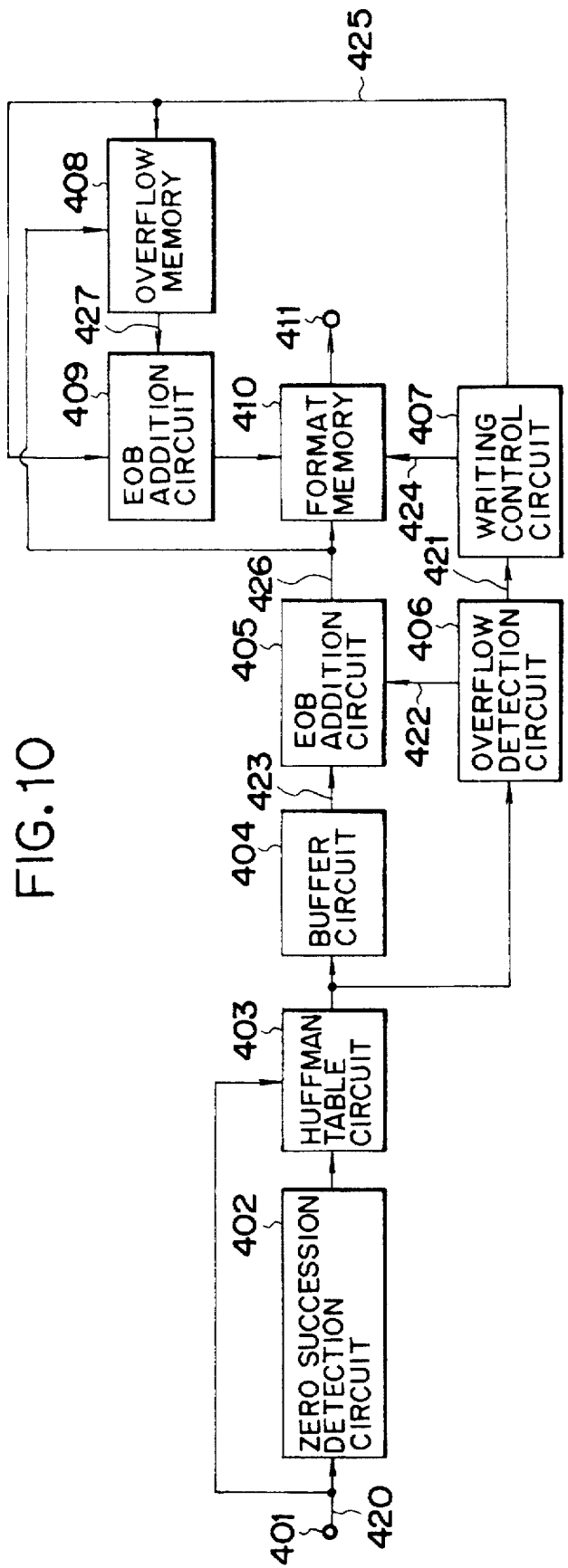
FIG. 10 is a block diagram of a variable length encoding circuit in accordance with a second embodiment of the present invention.
Figure 11:
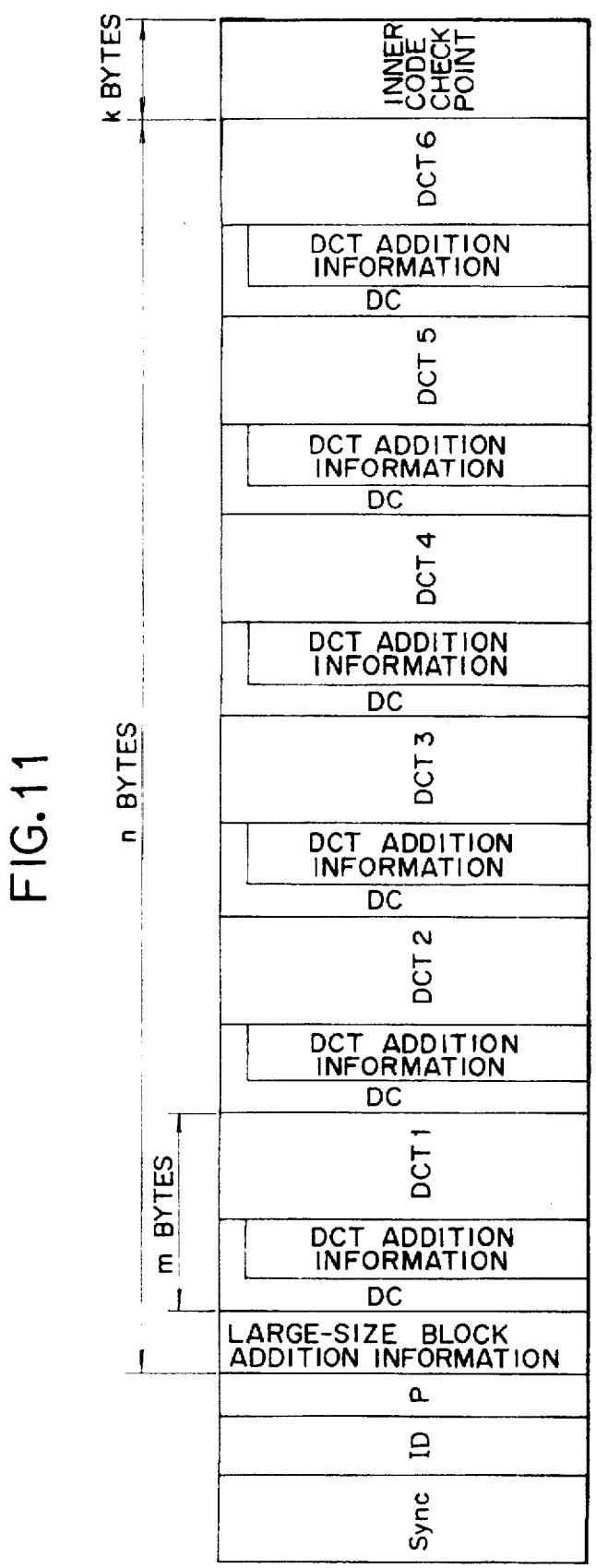
FIG. 11 illustrates a sink block of a transmission format in the second embodiment.
Figure 12:
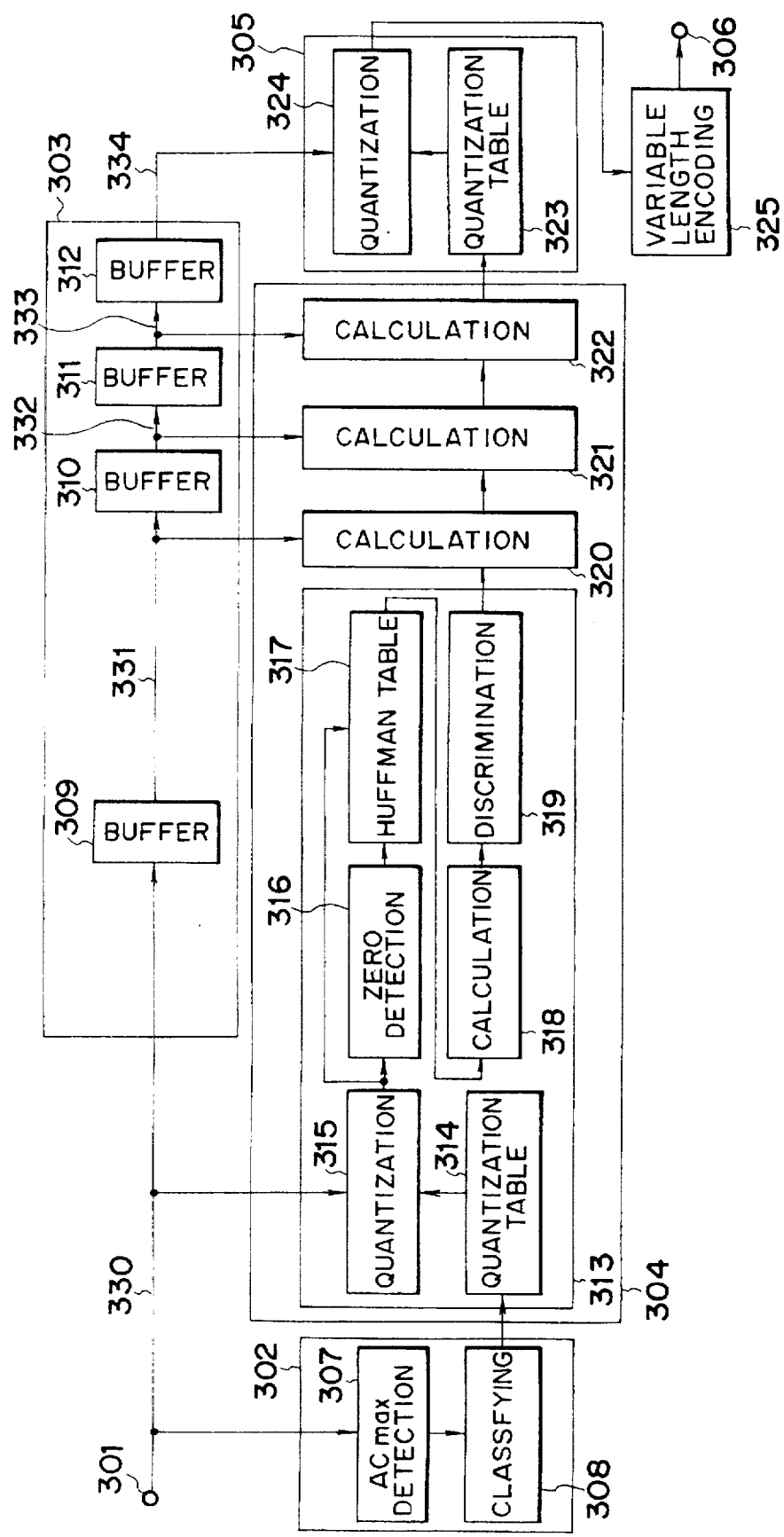
FIG. 12 is a block diagram of an encoding apparatus of the second embodiment.

FIG. 10 is a block diagram of a variable length encoding circuit in accordance with the second embodiment of the present invention. FIG. 11 is a sink block of a transmission format in the second embodiment. FIG. 12 is a block diagram of a configuration of an encoding apparatus in the second embodiment.

The input image signal is formed into small blocks of 8 pixels (horizontal)×8 pixels (vertical), which are two-dimension DCT converted, and 30 such DCT blocks are formed into a large block to conduct the constant information quantity control. Specifically, where $Y/C_r/C_b$ of the NTSC component signal is sampled at a ratio of 4/1/1, the block (hereinafter referred to as a macro block) comprises four luminance signal (Y) DCT blocks and one color difference signal ($C_r$, $C_b$) DCT block.

In the present embodiment, five macro blocks are sampled from locations separated on the screen to form a large block to conduct the constant information quantity control. As shown in FIG. 11, the encoded data having the information quantity controlled is formatted by using five sink blocks each divided into six DCT areas corresponding to the macro blocks.

Referring to FIG. 12, an operation of the present embodiment is now described. The signal applied from the input terminal 301 has the number of samples of the image signal to select 30 DCT blocks with any rule to one frame of data so that they are formed into a large block. Further, each large block is subdivided to small blocks each comprising 8×8 pixels. The two-dimension DCT conversion is applied to each small block and 64 coefficients in each small block are rearranged starting from the low frequency component. The conversion coefficients 330 of the input signal are sequentially delayed by a buffer circuit 303 comprising buffer circuits 309, 310, 311 and 312 for each large block and are also supplied to a sort circuit 302.

Figure 13:
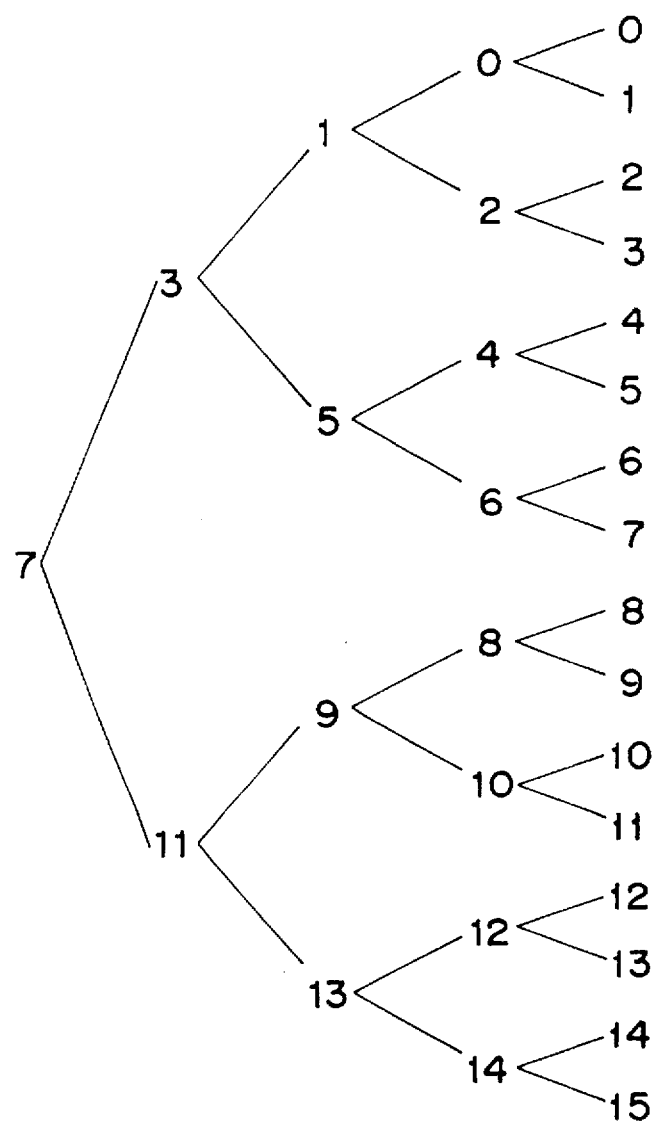
FIG. 13 illustrates a binary search of quantized numbers in the second embodiment.

The sort circuit 302 determines a maximum amplitude of the 63 coefficients excluding DC component by an ACmax detection circuit 307 for each small block and classifies them into four classes in accordance with the maximums by a classify circuit 308. Then, a binary search method for the quantized numbers shown in FIG. 13 is used to calculate an estimation of the code quantity by a code quantity estimate circuit 304 comprising four stages of calculation circuits 313, 320, 321 and 322. Since an identification code (EOB) is added following the last significant coefficient after the quantization of each small block and the remaining coefficients (all coefficients are zero) are not transmitted, the estimation of the information quantity is taken into consideration. FIG. 13 illustrates a binary search when 16 quantized numbers 0-15 are involved.

Applied to a quantization table circuit 314 are four classes of information determined by the sort circuit 302 and the $Y/C_r/C_b$ identification signal. In accordance with a table for selecting the quantization table as shown in FIG. 14, the quantization table T0-T3 as shown in FIGS. 15 to 18 is selected, and the quantization step selected for the quantization No. 7 by the quantization table circuit 314 is sent to a quantizer 315 for each of four divided bands of the small block.

Each table meets a relation of $T0 \geq T1 \geq T2 \geq T3$ for the information quantity. Each table comprises 16 quantized numbers 1-15 to divide the coefficient area after the orthogonal conversion into bands 1-4 to form a two-dimension table.

The quantizer 315 quantizes the conversion coefficient 330 by the quantization step sent from the quantization table circuit 314 and supplies it to a zero detection circuit 316 for detecting consecutive zeros and a Huffman table circuit 317, and a run length after two-dimension Huffman encoding by the run length and the amplitude is output to a counter 318.

The counter 318 accumulates the code quantity after the Huffman encoding for each large block, and a discrimination circuit 319 compares it with a predetermined information quantity.

A calculation circuit 320 estimates the code quantity of the large block by selecting the quantization table for each small block depending on the result of the preceding stage calculation circuit 313, for the conversion coefficient 331 having the delay time for the estimation of the code quantity adjusted by the buffer circuit 309, for the quantization No. 11 when the predetermined information quantity is exceeded as shown in FIG. 13, and for the quantization No. 3 when it is not exceeded, and the estimation is compared with the predetermined information quantity to determine the quantization No. of the succeeding stage. In the calculation circuits 321 and 322, similar calculations are conducted as shown in FIG. 5 for the conversion coefficients 332 and 333 to determine the quantization No. which is closest to the predetermined information quantity without exceeding it, and it is supplied to the quantization circuit 305. The quantization table circuit 323 outputs the quantization step to the quantizer 324 by the determined quantization No., the class information and the identification signal Y/C$_r$/C$_b$.

Applied to the quantizer 324 is the conversion coefficient 334 having the delay time for the code quantity estimation adjusted by the buffer circuit 303 to conduct the final quantization of the conversion coefficient 334. Then, the variable length encoding such as two-dimension Huffman encoding is conducted by the variable length encoding circuit 325 and it is output from an output terminal 306.

Referring to FIG. 10, an operation of the variable length encoding circuit 325 is described. The quantized data 420 supplied from an input terminal 401 is counted by a consecutive zeros detection circuit 402 for the consecutive zero coefficients, and the resulting count together with the quantized data 420 are sent to a Huffman table circuit 403. The Huffman table circuit 403 comprises a ROM and it supplies the Huffman code encoded by the run length and the amplitude by using the two-dimension table to a buffer circuit 404 and an overflow detection circuit 406.

The overflow detection circuit 406 accumulates the number of code words and the number of bits exceeding the transmission area (m bytes in FIG. 11) corresponding to the DCT block, for each DCT block and accumulates the number of bits exceeding the information quantity of 30 DCT block each consisting of m×30 bytes, and supplies the accumulation signal 421 to a write control circuit 407. In addition, it detects the last significant coefficient for each DCT block and outputs a control signal 422 to an EOB addition circuit 405. Namely, the EOB addition circuit 405 is controlled to add the identification code (EOB) following to the last significant coefficient for each DCT block to the encoded data 423 having the delay for the 30 DCT blocks applied by the buffer circuit 404.

The write control circuit 407 outputs to a format memory 410 a control signal 424 for writing encoded words of the DCT block having the information quality of smaller than m bytes and encoded words of smaller than m bytes of the DCT block having the information quantity exceeding m bytes, into a format memory 410 mapped in accordance with a transmission format shown in FIG. 11, for each encoded word. It also outputs to an overflow memory 408 a control signal 425 for writing the remaining encoded words of the DCT block having the information quantity exceeding m bytes into the overflow memory 408 for each bit.

Further, the write control circuit 407 accumulates the information quantity from the last encoded word of the DCT block exceeding m bytes. The accumulation of the information quantity is conducted until the overflown information quantity is exceeded for every 30 DCT blocks. In order to permit the uniform cut-away of the encoded word at the DCT block which exceeds m bytes, a timing to add the EOB is output to the EOB addition circuit 409 at a timing of the transfer of the data written in the overflow memory 408 to the format memory 410.

The encoded data 426 having the EOB added by the EOB addition circuit 405 is written into the format memory 410 and the overflow memory 408. It is written into 30 DCT block as a unit by the control of the write control circuit 407. In the writing to the format memory 410, large block addition information is written for each large block in accordance with a format shown in FIG. 11, and a DC coefficient, DCT addition information and an AC coefficient are sequentially written for each small block in a frequency sequence from the low frequency end to the high frequency end.

Then, the encoded data 427 read from the overflow memory 408 is applied with the EOB by the EOB addition circuit such that the information quantity is smaller than m×30 bytes. Then, they are sequentially loaded, bit by bit, to a vacant area of the format area mapped in accordance with the transmission format stored in the format memory 410. The data formatted for the transmission in the format memory 410 is read in the order of transmission and output from the output terminal 411. Then, the sink and ID information is added and is sent to a transmission line.

Since the transmission of the encoded data which overflows the information quantity of the small block area is eliminated from the last encoded word, the transmission is eliminated from the high frequency components of the DCT block having a large information quantity.

In accordance with the second embodiment, when the information is written in the transmission format having the predetermined area for each small block while the control is made to attain the constant information quantity of the large block after the encoding, the encoded data which overflows the predetermined area corresponding to the small block is stored in the memory means for each small block, and the encoded data which overflows the predetermined area is measured for each large block, and transmission of the encoded data stored in the memory means is eliminated in accordance with the measured information quantity to maintain the constant information amount of the large block. Accordingly, the encoded data which are not transmitted when the data overflows is not concentrated in a particular block. As a result, when the image signal is encoded by using the encoding apparatus of the present invention, the concentration of the deterioration of the image quality in decoding is prevented and the deterioration of the image quality in reproduction is minimized.

In accordance with the second embodiment of the present invention, the weighting is made based on the characteristic of the distribution or encoding block and the transmission is eliminated from the high frequency component. Accordingly, when the image signal is encoded, the information may be cut away from the low frequency area which exhibits a low sensitivity in terms of the visual sense and the deterioration of the image quality due to the overflow of data is minimized.

While the preferred embodiments of the present invention have been shown and described, it should be understood that the present invention is not limited to those embodiments and various effective variations may be made without departing from the spirit of the invention. For example, while the information of the DCT block exceeding m bytes is uniformly cut away from the high frequency region in the second embodiment, the weighting may be made in accordance with the characteristic of blocks Y, C$_r$ and C$_b$ to delete the information from the frequency block having a low sensitivity in terms of visual sensitivity.

In other words, the foregoing description of the embodiments has been given for illustrative purposes only and is not to be construed as imposing limitations in any respect.

The scope of the invention is, therefore, to be determined solely by the following claims and is not limited by the text of the specifications and alterations made within a scope equivalent to the scope of the claims falls within the true spirit and scope of the invention.

What is claimed is:

1. An encoding apparatus comprising:
   a) input means for inputting sample information data;
   b) block forming means for forming blocks of the information data input by said input means;
   c) encoding means for encoding information data in the blocks formed by said block forming means;

d) detection means for detecting a code quantity of encoded data on a unit basis of a predetermined number of blocks formed by said block forming means, the predetermined number being greater than one;

e) one-dimension processing means for applying one-dimension processing to the encoded data corresponding to the predetermined number of blocks formed by said block forming means; and f) deletion means for deleting at least a portion of the encoded data in accordance with the encoded data processed by said one-dimension processing means and in accordance with an output of said detection means.

2. An encoding apparatus according to claim 1, wherein said encoding means includes orthogonal conversion means for orthogonally converting the input information data.

3. An encoding apparatus according to claim 2, wherein said orthogonal conversion means conducts DCT conversion.

4. An encoding apparatus according to claim 2, wherein said one-dimension processing means sequentially reads the encoded data from each of said blocks from a low frequency end to a high frequency end for conducting the one-dimension processing.

5. An encoding apparatus according to claim 4, wherein said deletion means deletes data starting from high frequency components.

6. An encoding apparatus according to claim 1, wherein said information data includes image data.

7. An encoding apparatus according to claim 6, further comprising control means for controlling a deletion process by said deletion means in accordance with signal components of the image data.

8. An encoding apparatus comprising:

a) input means for inputting sample image data in predetermined units, each predetermined unit containing a same predetermined amount of the input sample image data, and each predetermined unit including a plurality of signal components of the sample image data;

b) encoding means for encoding the image data;

c) detection means for detecting a code quantity of the encoded data on the unit basis of a plurality of the predetermined units;

d) deletion means for deleting at least a portion of the encoded data in accordance with an output of said detection means; and e) control means for controlling a deletion process by said deletion means in accordance with the plurality of predetermined units.

9. An encoding apparatus according to claim 8, wherein said encoding means includes orthogonal conversion means for orthogonally converting the image data input by said input means.

10. An encoding apparatus according to claim 9, wherein said orthogonal conversion means conductes DCT conversion.

11. An encoding apparatus according to claim 9, wherein said deletion means deletes data starting from high frequency components.

12. An encoding apparatus according to claim 9, wherein the signal components of the image data include a luminance signal component and a color signal component.

13. An encoding apparatus according to claim 8, wherein said encoding means includes block forming means for forming blocks of the input image data and conversion means for orthogonally converting the image data outputted from said block forming means.

14. An encoding apparatus according to claim 13, wherein said predetermined unit comprises a plurality of said blocks.

15. An encoding apparatus according to claim 14, wherein said deletion means includes one-dimension processing means for sequentially reading the encoded data from each of said blocks from a low frequency end to a high frequency end and applying one-dimension processing thereto.

16. An encoding apparatus, comprising:

a) input means for inputting image data;

b) block forming means for forming blocks of the image data input by said input means;

c) detection means for detecting an amount of code which results when the image data is encoded, on the unit basis of a plurality of blocks formed by said block forming means;

d) encoding means for encoding the image data in the blocks formed by said block forming means, according to an output of said detection means; and e) deletion means for deleting at least a portion of the image data encoded by said encoding means, according to the amount of code detected by said detection means for said plurality of blocks.

17. An apparatus according to claim 16, wherein the image data comprises luminance component data and chrominance component data and said deletion means performs a weighting processing according to the component data.

18. An apparatus according to claim 16, wherein said encoding means includes quantization means for quantizing the image data on the unit basis of one block formed by said block forming means, and wherein a quantization step of said quantization means is controlled according to the output of said detection means.

19. An apparatus according to claim 18, wherein said encoding means includes orthogonal transform means for orthogonally transforming the image data on the unit basis of one block formed by said block forming means.

20. An apparatus according to claim 18, wherein said deletion means reduces a high frequency component from the encoded image data.

21. An encoding method comprising:

a) an input step of inputting sample information data;

b) a block forming step of forming blocks of the information data input in said input step;

c) an encoding step of encoding information data in the blocks formed in said block forming step;

d) a detection step of detecting a code quantity of encoded data on a unit basis of a predetermined number of blocks formed in said block forming step, the predetermined number being greater than one;

e) a one-dimension processing step of applying one-dimension processing to the encoded data corresponding to the predetermined number of blocks formed in said block forming step; and f) a deletion step of deleting at least a portion of the encoded data in accordance with the encoded data processed in said one-dimension processing step and in accordance with an output of said detection step.

22. An encoding method comprising:

a) an input step of inputting sample image data in predetermined units, each predetermined unit containing a same predetermined amount of the input sample image data, and each predetermined unit including a plurality of signal components of the sample image data;

b) an encoding step of encoding the image data;

c) a detection step of detecting a code quantity of the encoded data on the unit basis of a plurality of predetermined units;

d) a deletion step of deleting at least a portion of the encoded data in accordance with the output of said detection step; and e) a control step of controlling a deletion process in said deletion step in accordance with the plurality of predetermined units.

23. An encoding method, comprising:

a) an input step of inputting image data;

b) a block forming step of forming blocks of the image data input in said input step;

c) a detection step of detecting an amount of code which results when the image data is encoded, on the unit basis of a plurality of blocks formed in said forming step;

d) an encoding step of encoding the image data in the blocks formed in said block forming step, according to an output of said detection step; and e) a deletion step of deleting at least a portion of the image data encoded in said encoding step, according to the amount of code detected in said detection step for said plurality of blocks.

* * * * *